United States Patent [19]

Lo

[11] Patent Number: 5,645,797
[45] Date of Patent: Jul. 8, 1997

[54] METHOD AND APPARATUS FOR GAS/ LIQUID CONTACT

[75] Inventor: Sin-Man Lo, Oxon, England

[73] Assignee: Anglian Water Services, Ltd., Huntingdon, United Kingdom

[21] Appl. No.: 274,505

[22] Filed: Jul. 13, 1994

[30] Foreign Application Priority Data

Jul. 14, 1993 [GB] United Kingdom ............... 9314617

[51] Int. Cl.$^6$ .................................................. C02F 1/78
[52] U.S. Cl. .......................... 422/28; 261/123; 210/199; 210/760
[58] Field of Search .................. 422/1, 28, 37, 422/22, 186.07, 224, 228, 231, 236, 305; 261/123, 122.1, DIG. 42; 210/760, 199, 220, 320

[56] References Cited

U.S. PATENT DOCUMENTS

| | | | |
|---|---|---|---|
| 3,276,994 | 10/1966 | Andrews | ............... 261/123 |
| 3,764,014 | 10/1973 | Stern et al. | ............... 261/123 |
| 3,945,918 | 3/1976 | Kirk | ............... 210/760 X |
| 4,507,253 | 3/1985 | Wiesmann | ............... 210/760 X |
| 4,680,111 | 7/1987 | Ueda | ............... 210/199 |
| 5,053,140 | 10/1991 | Hurst | ............... 422/28 X |
| 5,180,499 | 1/1993 | Hinson et al. | ............... 210/760 X |
| 5,348,664 | 9/1994 | Kim et al. | ............... 210/760 X |

FOREIGN PATENT DOCUMENTS

| | | |
|---|---|---|
| 60-153988 | 8/1985 | Japan . |
| 4035790 | 2/1992 | Japan . |

*Primary Examiner*—Robert J. Warden
*Assistant Examiner*—E. Leigh Dawson
*Attorney, Agent, or Firm*—Wigman, Cohen, Leitner & Myers, P.C.

[57] ABSTRACT

Especially for use in disinfecting water by bubbling a was such as ozone, novel apparatus having an inlet an outlet for liquid and which defines a flow path therebetween, the path including, in succession, a downward flow zone including a gas bubble inlet and an upward flow zone, the adjacent downward and upward flow zones being separated by a wall beneath which there is a gap for the flow between the zones, wherein the gas bubble inlet is at a height of at least 50% of the height of the gap.

6 Claims, 1 Drawing Sheet

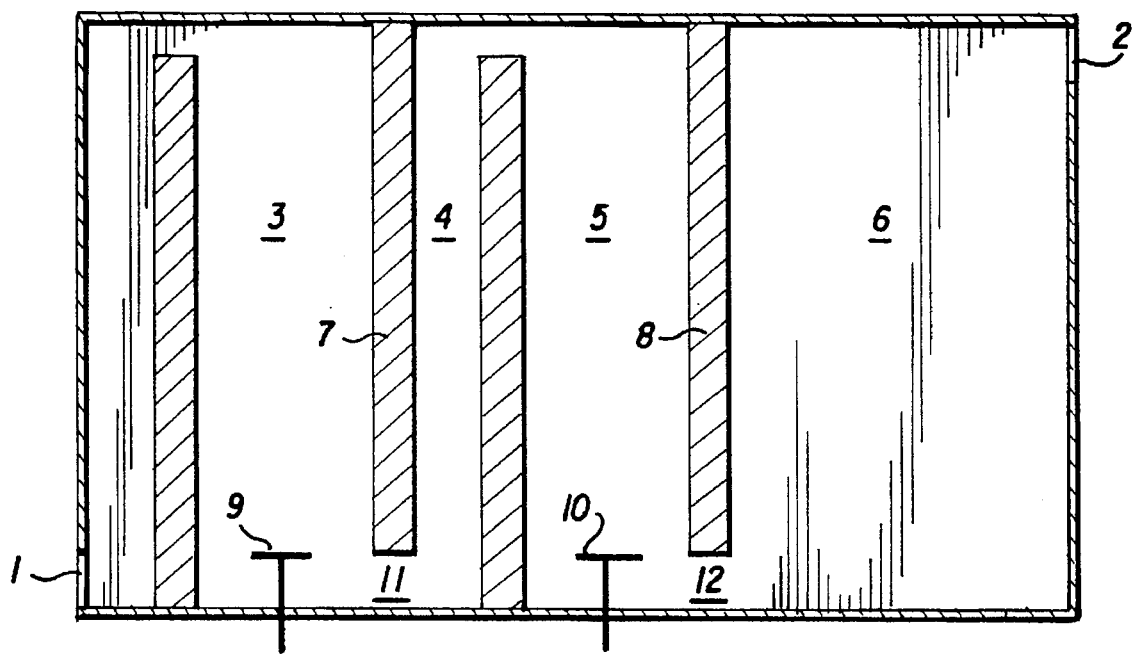

METHOD AND APPARATUS FOR GAS/LIQUID CONTACT

FIELD OF THE INVENTION

This invention relates to a method for improving gas/liquid contact, and to apparatus for use in such a method.

BACKGROUND OF THE INVENTION

Many systems are known, which involve gas/liquid contact, e.g. for the aerobic digestion of biomass, using oxygen or air, and for the disinfection of water, using chlorine or, increasingly, ozone. These systems are generally based on the principle of introducing bubbles of the gas into the liquid, e.g. in counter-current, with a view to maximising the degree of contact between the active gas and the liquid.

A known ozone treatment tank comprises an inlet and an outlet for liquid and defines a flow path including, in succession, a downward flow or diffuser zone including a gas bubble inlet and an upward flow or decay zone, the zones being separated by a wall beneath which there is a gap for the flow between these zones. In conventional such systems, the bubble diffuser or other gas inlet has been positioned at the base of the diffuser zone.

SUMMARY OF THE INVENTION

It has now been discovered that the efficiency of gas/liquid contact can be improved, with consequent savings in the cost of expensive materials such as ozone, if apparatus of the type described above is modified such that the gas bubble inlet in the diffuser zone is at a height of at least 50% of the height of the gap separating the diffuser and decay zones. Without wishing to be bound by theory, it is believed that the improved results are the result of ensuring that a reduced proportion of gas bubbles are diverted by the liquid flow into the decay zone, where they pass in co-current with the liquid and may even increase the flow rate there. Increased flow rate in the decay zone is undesirable, because that zone is adapted to allow all disinfectant to mix with the liquid before the latter passes through the outlet of the apparatus.

BRIEF DESCRIPTION OF THE DRAWING

The invention will now be described by way of example only with reference to the accompanying drawing, which is a schematic cross-sectional view of apparatus embodying the present invention. The apparatus comprises an inlet 1 and outlet 2 between which a flow path is defined, comprising a first diffuser zone 3, a first decay zone 4, a second diffuser zone 5 and a final decay zone 6. The respective first zones are separated by a wall 7 and the respective second zones by a wall 8. Towards the base, but raised above that, in each of the diffuser zones, are gas diffusers 9 and 10, each at the height of the respective flow gaps 11 and 12.

DESCRIPTION OF THE INVENTION

In simple terms, the present invention depends upon raising the gas diffuser or other inlet above the floor of the diffuser zone. The diffuser is preferably raised to within 10 or 25% of the height of the gap, and is most preferably at about the height of the gap. It may be raised further, and this may indeed encourage greater gas/liquid contact; however, this is at the expense of a decreased height of the effective diffuser zone, for a given apparatus.

In a typical example, the height of each zone is about 6 m, and the height of the gap up to 1 m. There may be any number of combinations of contact and decay zones. Usually, the last decay zone will be relatively large, in order to provide the maximum possibility of gas/liquid contact, and the complete removal of, say, ozone, before the liquid passes through the outlet of the apparatus. A preferred configuration of this last decay zone is described in the copending, commonly-assigned patent application Ser. No. 08/274,506, currently pending, made by Edwin W. J. Murrer, Philip P. Butler and me, having the same filing date, entitled "Method and Apparatus for Improving Liquid Flow".

It will be readily appreciated that the "wall" is not necessarily of thin cross-section. The term "wall" is used merely to define the fact that there are discrete diffuser and decay zones, with a channel for liquid flow between them.

What I claim is:

1. Apparatus for gas/liquid contact, said apparatus comprising an enclosure having a floor and an inlet and outlet for liquid and a flow path therebetween, said flow path including, in immediate succession, a first downward flow zone including a first gas bubble inlet located within said first downward flow zone and a first upward flow zone, a second downward flow zone including a second gas bubble inlet located within said second downward flow zone and a second upward flow zone, the adjacent first and second downward and upward flow zones each being separated by a wall spaced away from said enclosure and having a lower end beneath which a gap is formed by a space between said floor and said wall for the flow between said zones, wherein said first and second gas bubble inlets are positioned at a height from said floor of at least 50% of the space between said floor of said enclosure and said lower end of said wall which forms said gap.

2. Apparatus according to claim 1, in which said first and second gas bubble inlets are at substantially the same height as the lower end of said wall.

3. A method for disinfecting water, which comprises passing the water through apparatus according to claim 1, and introducing ozone through said first and second gas bubble inlets into the water.

4. Apparatus for gas/liquid contact, said apparatus comprising an enclosure having a floor and an inlet and outlet for liquid and a flow path therebetween, said flow path including, in immediate succession, a first downward flow zone including a first gas bubble inlet located within said first downward flow zone and a first upward flow zone, a second downward flow zone including a second gas bubble inlet located within said second downward flow zone and a second upward flow zone, the adjacent first and second downward and upward flow zones each being separated by a wall spaced away from said enclosure and having a lower end beneath which a gap is formed by a space between said floor and said wall for the flow between said zones, wherein said first and second gas bubble inlets are positioned at a height from said floor of between 50% and 100% of the space between said floor of said enclosure and said lower end of said wall which forms said gap.

5. Apparatus according to claim 4, in which said first and second gas bubble inlets are at substantially the same height as the lower end of said wall.

6. A method for disinfecting water, which comprises passing the water through apparatus according to claim 4, and introducing ozone through the gas bubble inlet into the water.

* * * * *